United States Patent [19]

Aizawa et al.

[11] Patent Number: 5,441,810
[45] Date of Patent: Aug. 15, 1995

[54] ADHESIVE SHEET

[75] Inventors: Kaoru Aizawa; Toshiyuki Ohshima; Hiroomi Hanai; Naoki Okochi, all of Osaka, Japan

[73] Assignee: Nitto Denko Corporation, Osaka, Japan

[21] Appl. No.: 203,031

[22] Filed: Feb. 28, 1994

[30] Foreign Application Priority Data

Feb. 26, 1993 [JP] Japan ................... 5-038457
Aug. 19, 1993 [JP] Japan ................... 5-226527

[51] Int. Cl.⁶ .............................................. B32B 7/12
[52] U.S. Cl. ................... 428/354; 428/174; 428/40; 428/304.4; 428/352; 428/402; 428/402.2
[58] Field of Search ............... 428/174, 402, 304.4, 428/354, 343, 352, 40, 402.2

[56] References Cited

U.S. PATENT DOCUMENTS

| 4,091,157 | 5/1978 | Hori et al. | 428/196 |
| 4,243,462 | 1/1981 | Huti et al. | 428/354 |
| 4,358,489 | 11/1982 | Green | 428/31 |
| 4,424,246 | 1/1984 | Pieslak et al. | 428/343 |
| 4,855,170 | 8/1989 | Darvell et al. | 428/40 |
| 5,151,327 | 9/1992 | Nishiyama et al. | 428/343 |

FOREIGN PATENT DOCUMENTS 0206760 12/1986 European Pat. Off. .

OTHER PUBLICATIONS

Database WPI, Week 8836, Derwent Publications Ltd., AN 254795.

Primary Examiner—Donald J. Loney
Attorney, Agent, or Firm—Sughrue, Mion, Zinn, Macpeak & Seas

[57] ABSTRACT

An adhesive sheet comprising a substrate having formed on one surface or both surfaces thereof a rubber-like elastic layer, a heat-expandable layer, and an adhesive layer in the order from the substrate side.

10 Claims, 2 Drawing Sheets

ADHESIVE SHEET

FIELD OF THE INVENTION

The present invention relates to an adhesive sheet having an excellent adhesive strength and also which can be easily peeled from the adhered material by heat treatment at any optional time.

BACKGROUND OF THE INVENTION

Hitherto, an adhesive sheet comprising a pressure-sensitive adhesive layer which contains a foaming agent, having formed thereon a pressure-sensitive adhesive layer which does not contain a foaming agent is known as disclosed in, for example, JP-A-63-186791 (the term "JP-A" as used herein means an "unexamined published Japanese patent application"). This is to overcome the difficulty that a conventional adhesive sheet prepared by simply forming a foaming agent-containing pressure-sensitive adhesive layer on a substrate is difficult to show a sufficient adhesive strength to a material to which the adhesive sheet is adhered due to the decreased adhesive force caused by containing the foaming agent [see, JP-B-50-13878, JP-B-51-24534 (the term "JP-B" as used herein means an "examined published Japanese patent application"), JP-A-56-61468, JP-A-56-61469, JP-A-60-252681, etc.).

However, formation of the pressure-sensitive adhesive layer which does not contain a foaming agent can achieve the increase of the adhesive strength to a material to be adhered, but there is a problem that when the foaming agent is foamed or the adhesive sheet is subjected to an expanding treatment by heating, it sometimes occurs that decrease of the adhesive strength by the reduction of the adhered area is insufficient and a satisfactory peeling effect does not exhibit.

SUMMARY OF THE INVENTION

An object of the present invention is to provide an adhesive sheet having both the excellent adhesive strength to a material to be adhered and the excellent decreasing effect of the adhesive strength by a heat treatment.

The adhesive sheet according to the present invention comprises a substrate having formed on one surface or both surfaces thereof a rubber-like elastic layer, a heat-expandable layer, and an adhesive layer in the order from the substrate side.

DETAILED DESCRIPTION OF THE INVENTION

The present invention is described in detail below.

By the separated structure of the heat-expandable layer and the adhesive layer in the above-described order, the adhesive sheet can show the adhesive properties comparable to those of an adhesive which does not contain a foaming agent, whereby the adhesive strength to a material to be adhered can be easily achieved and thus the desired adhesive strength can be obtained. It is also possible to exist the foaming agent near a material to be adhered at a high density.

On the other hand, by disposing the heat-expandable layer on a material to be adhered through the rubber-like elastic layer, the force for foaming and/or expanding the heat-expandable layer overcomes the counterforce due to the elasticity of the rubber-like elastic layer at a treatment temperature for foaming and/or expanding the heat-expandable layer, to three-dimensionally deform the heat-expandable layer into a waved structure or waving structure, whereby the reduction of the adhered area by a heat treatment is efficiently attained and decrease of the adhesive strength capable of facilitating peeling of the adhesive sheet is surely realized.

The adhesive sheet of the present invention comprises the substrate having formed on one surface or both surfaces thereof the rubber-like elastic layer, a heat-expandable layer, and the adhesive layer in the order from the substrate side. Examples thereof are shown in FIG. 1 and FIG. 2.

Figure 1:
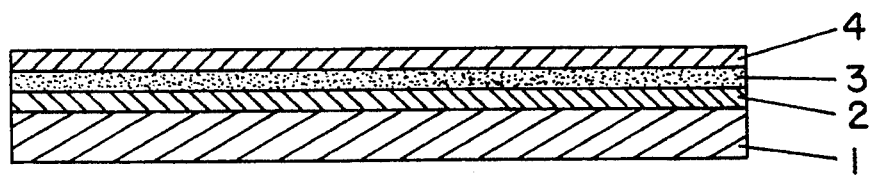
FIG. 1 is an enlarged cross sectional view showing an example of the adhesive sheet of the present invention.
Figure 2:
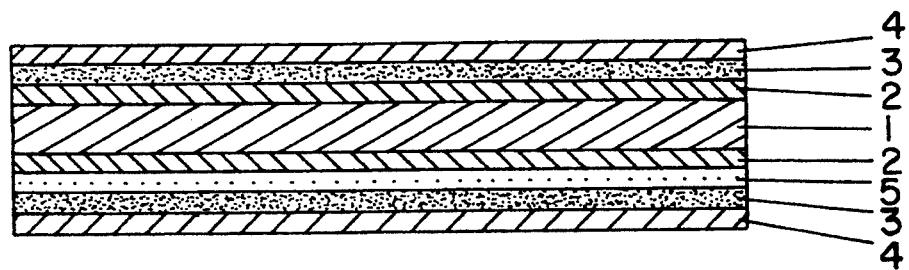
FIG. 2 is an enlarged cross sectional view showing another example of the adhesive sheet of the present invention.

FIG. 1 is an enlarged cross sectional view of an example of the adhesive sheet of the present invention having the layers on one surface of a substrate.

As shown in FIG. 1, a rubber-like elastic layer 2, a heat-expandable layer 3, and an adhesive layer 4 are successively formed on one side of a substrate 1. In FIG. 2, these layers are formed on both sides of a substrate and in FIG. 2, an interlayer 5 which may be formed, if necessary, is formed.

The adhesive sheet of the present invention may be of a peelable type wherein the substrate can be easily peeled from the rubber-like elastic layer or may be of a fixable type wherein the substrate is strongly attached to the rubber-like elastic layer. In addition, the adhesive sheet of the present invention may comprise a substrate having the rubber-like elastic layer, the heat-expandable layer, and the adhesive layer on one surface of the substrate and an ordinary adhesive layer on the opposite surface of the substrate.

The substrate is used as a support body of the adhesive sheet and a plastic film or sheet is generally used. For example, appropriate thin materials such as papers, cloths, nonwoven fabrics, metal foils, laminates of those and a plastic film or sheet, laminates of plastic films or sheets, etc., can be used. The thickness of the substrate is generally from 5 to 250 $\mu$m.

The above-described peelable type adhesive sheet can be prepared using, for example, a low-adhesive substrate. The low-adhesive substrate can be obtained by, e.g., a method of coating a releasing agent such as a silicone resin, a fluorine resin, etc., a method of using a substrate having a weak adhesive force comprising a non-polar polymer such as polyethylene, polypropylene, etc.

The fixed-type adhesive sheet can be prepared using, for example, a substrate having a strong adhesive property. The substrate having a strong adhesive property can be obtained by a chemical or physical treatment which oxidizes the surface of the substrate by, e.g., a chromic acid treatment, an ozone exposure, a flame exposure, a high-voltage shock exposure, an ionizing radiation treatment, etc., a method of using a substrate having a strong adhesive force comprising a high polar polymer such as polyester, etc.

The rubber-like elastic layer, the heat-expandable layer, and the adhesive layer in the present invention are a composite for attaining a good adhesive strength and sufficient decrease of the adhesive strength by a heat treatment and such the object can be attained by forming the laminate structure wherein the layers are disposed in the above-described order.

The rubber-like elastic layer functions to provide a large adhesive area by conforming well the surface thereof with the surface form of a material to be adhered at adhering the adhesive sheet to the material and functions to promote that the heat-expandable layer is three-dimensionally deformed to form a three-dimensional structure such as a waved structure by reducing the restriction of foaming and/or expansion of the heat-expandable layer in the plane direction thereof when the heat-expandable layer is foamed and/or expanded by heating to peel the adhesive sheet from the material to which the adhesive sheet is adhered.

The rubber-like elastic layer can be formed by a natural rubber or a synthetic rubber each having a Shore D-type hardness by ASTM D-2240, D-Type Shore of 50 or less, and preferably 40 or less, or a synthetic resin having a rubber elasticity. The thickness of the rubber-like elastic layer is generally from 0.1 to 150 $\mu$m.

Examples of the synthetic rubber or synthetic resin are synthetic rubbers such as a nitrile rubber, a diene rubber, an acrylic rubber, etc.; thermoplastic elastomers such as a polyolefin elastomer, a polyester elastomer, etc.; and synthetic resins having a rubber elasticity, such as an ethylene-vinyl acetate copolymer, polyurethane, polybutadiene, soft polyvinyl chloride, etc. In addition, an essentially hard polymer such as polyvinyl chloride, etc., imparted with a rubber elasticity by the combination with a compounding agent such as a plasticizer, a softening agent, etc., can be used in the present invention.

The rubber-like elastic layer may be formed by a method of coating a solution of a component comprising a natural rubber, a synthetic rubber, or an synthetic resin having a rubber elasticity, a method of adhering a film or the like comprising the above-described component to the substrate, and the like. In addition, the rubber-like elastic layer in the present invention may be formed by a pressure-sensitive adhesive material mainly comprising a natural rubber, a synthetic rubber, or a synthetic resin having a rubber elasticity or may be formed by a foamed film mainly comprising the above-described component.

The heat-expandable layer acts to decrease the adhered area thereof with the material to which the adhesive sheet is adhered, by giving the volume change to the composite described above with the foaming and/or expanding treatment of the heat-expandable layer by heating when the adhesive sheet is peeled from the material to which the adhesive sheet is adhered at a desired time, whereby the adhesive sheet can be easily peeled from the material. The heat-expandable layer can be generally formed using a foaming agent and a binder.

Various materials capable of attaining the above purpose can be used as the foaming agent. Examples thereof are decomposition-type inorganic foaming agents and organic foaming agents.

Examples of the decomposition-type inorganic foaming agents are ammonium carbonate, ammonium hydrogencarbonate, sodium hydrogencarbonate, ammonium sulfite, sodium borohydride, azides, etc.

Examples of the organic foaming agent are alkane fluorides such as trichloromonofluoromethane, dichloromonofluoromethane, etc.; azo compounds such as azobis-isobutyronitrile, azodicarbonamide, barium azodicarboxylate, etc.; hydrazine compounds such as p-toluenesulfonylhydrazide, diphenylsulfone-3,3'-disulfonylhydrazide, 4,4'-hydroxybis(benzenesulfonylhydrazide), allylbis(sulfonylhydrazide), etc.; semicarbazide compounds such as p-toluylenesulfonylsemicarbazide, 4,4'-hydroxybis(benzenesulfonylsemicarbazide), etc.; triazole compounds such as 5-morpholyl-1,2,3,4-thiatriazole, etc.; and N-nitroso compounds such as N,N'-dinitrosopentamethylenetetramine, N,N'-dimethyl-N,N'-dinitrosoterephthalamide, etc.

The foaming agents which can also be used in the present invention are heat-expandable microspheres prepared by encapsulating an appropriate material which is easily gasified to show a heat-expandable property, such as isobutane, propane, pentane, etc., with a shell-forming material by a coacervation method, an interfacial polymerization method, etc. The mean particle size of the heat-expandable microspheres used in a present invention is generally from 1 to 50 $\mu$m.

Examples of the shell-forming material which forms the heat-expandable microspheres are generally a vinylydene chloride-acrylonitrile copolymer, polyvinyl alcohol, polyvinyl butyral, polymethyl methacrylate, polyacrylonitrile, polyvinylidene chloride, and polystyrene, but any shell-forming material can be used in the present invention so long as it comprises a heat-melting material or a material which is ruptured by the thermal expansion.

The binder used for forming the heat-expandable layer is conventional rubber series and resin series polymers which allow foaming and/or expansion of the foaming agent, and the polymers which do not restrain foaming and/or expanding of the foaming agent are preferably used.

The heat-expandable layer can be formed by, for example, a method of mixing the foaming agent and the binder, if necessary, using a solvent and coating the mixture on the rubber-like elastic layer formed on the substrate. In addition, an interlayer may be formed between the rubber-like elastic layer and the heat-expandable layer for the purpose of the improvement of the adhesive property, etc., as shown in FIG. 2.

The content of the foaming agent in the heat-expandable layer is generally at least 10% by weight, preferably from 15 to 95% by weight, and more preferably from 20 to 80% by weight. The thickness of the heat-expandable layer and the foaming ratio are appropriately determined according to the surface form and the material of a material to which the adhesive sheet is adhered, but the thickness thereof is generally from 3 to 70 $\mu$m. It is preferred to form the heat-expandable layer such that the foaming ratio becomes about 1.5 to 100 times.

When the heat-expandable microspheres are used as the foaming agent, it is preferred that the heat-expandable microspheres are closely distributed such that the distance between the heat-expandable microspheres is 7 times or less, and preferably 3 times or less, the diameter of the microspheres having the largest diameter from the standpoint of surely attaining peeling of the adhesive sheet from the material to which the adhesive sheet is adhered, by heating. This construction is particularly advantageous in the case of directly forming the heat-expandable layer on the rubber-like elastic layer without formation of the interlayer.

An appropriate adhesive can be selectively used for the adhesive layer according to the adhesive strength required for the adhesive sheet to the surface of the material to be adhered. Hence, there is no particular restriction on the adhesive used and conventional adhesives can be appropriately used. In general, a low temperature activatable adhesive, a water- or organic solvent-activatable adhesive, and a pressure-sensitive adhesive are used.

Examples of the low temperature activatable adhesive and the water- or organic solvent-activatable adhesive are hot-melt type adhesives, silicone adhesives, fluorine adhesives, ultraviolet-curable adhesives, and thermally pressure-sensitive adhesives which contain a heat-melting resin having a low melting point and show a low adhesive force at normal temperature but show a strong adhesive force by heating (as disclosed in JP-A-56-13040 and JP-B-2-50146).

Examples of the pressure-sensitive adhesives are rubber pressure-sensitive adhesives comprising a natural rubber or a synthetic rubber as the base polymer; acrylic pressure-sensitive adhesives comprising a polymer of an acrylic acid or methacrylic acid alkyl ester or a copolymer of an acrylic acid alkyl ester or methacrylic acid alkyl ester and other unsaturated monomer as the base polymer; pressure-sensitive adhesives comprising a polymer having a weight average molecular weight of from about 10,000 to 3,000,000, if necessary, compounded with an appropriate amount of a crosslinking agent (e.g., a polyisocyanate compound or an alkyletherified melamine compound); styrene-conjugated diene block copolymer-type pressure-sensitive adhesives; silicone pressure-sensitive adhesives; ultraviolet-curable pressure-sensitive adhesives; and creep-improving type pressure-sensitive adhesives as described in JP-A-56-61468, JP-A-61-174857, JP-A-63-17981, and JP-B-56-13040.

In addition, the pressure-sensitive adhesives may contain appropriate additives such as a plasticizer, a filler, an antioxidant, a tackifier, etc., in addition of the above-described crosslinking agent.

The adhesive layer may be formed by an appropriate method such as a method of coating a liquid adhesive solution on the heat-expandable layer, a method of transferring an adhesive layer formed on a separator onto the heat-expandable layer, etc.

The thickness of the adhesive layer is as small as possible from the point of shortening the distance between the surface of a material to which the adhesive sheet is adhered and the rubber-like elastic layer as short as possible and by considering the workability of forming the adhesive layer, the adhesive property to the material to be adhered, etc., the thickness of the adhesive layer is generally from about 0.1 to 50 μm, and preferably from 0.5 to 30 μm.

The adhesive sheet of the present invention can be prepared by, for example, a method of separately forming a composite layer comprising the rubber-like elastic layer and the heat-expandable layer and bonding the composite layer to a substrate through the rubber-like elastic layer side. The adhesive sheet obtained can be strongly adhered to a material to be adhered and in the case of releasing the adhered state, the adhesive sheet can be easily peeled or separated from the material by a heat treatment.

Accordingly, the adhesive sheet of the present invention can also be used to permanently bond two or more materials to be adhered comprising proper articles, etc., but the preferred use of the adhesive tape is that after adhering materials to be adhered using the adhesive sheet for a desired period of time, i.e., after achieving the adhered purpose, it is required or desired to release the adhered state.

There are various uses as the above use. For example, the uses are formation of an adhered composite of an article comprising a polymer and an article comprising fibers, a paper, etc., aiming at recycling; a carrier tape, a temporary fixing material, or a fixing material for transporting or temporary fixing parts in the assembling steps of various electric apparatus, electronic devices, display apparatus, etc.; a surface protecting material or a masking material for preventing the occurrence of staining and damaging of a metal plate, a plastic plate, a glass plate, etc.; and the like.

In addition, the heat-treatment condition which enables to easily peeling the adhesive sheet from the material to which the adhesive sheet is adhered is determined by the conditions of the reduction of the adhered area by the surface state of the material to be adhered, the kind of the foaming agent, etc., the heat resistance of the substrate of the adhesive sheet and the material to be adhered, and the like, but the general condition is a temperature of from 100° to 250° C. and a time of from 1 second to 90 seconds. The heat treatment can be conducted at an optional stage according to the use purpose.

As described above, since the adhesive sheet of the present invention has a composite structure of the rubber-like elastic layer, the heat-expandable layer, and the adhesive layer, the adhesive sheet can strongly adhere to even a material having a rough surface, and when it is desired to peel the adhesive sheet from the material, the layers are three-dimensionally deformed by a heat treatment to efficiently reduce the adhered area and decrease the adhesive force, whereby the adhesive sheet can be easily peeled from the material to which the adhesive sheet is adhered and thus the separation of the adhesive sheet from the material can be easily and surely conducted.

The present invention is described in more detail by reference to the following examples, but it should be understood that the present invention is not deemed to be limited thereto. All percents, parts, ratios and the like are by weight unless otherwise indicated.

EXAMPLE 1

A solution of a natural rubber was coated on one surface of a rayon-made nonwoven fabric having a thickness of 50 μm and dried to form a rubber-like elastic layer having a thickness of 10 μm. A mixed liquid containing heat-expandable microspheres was coated on the layer and dried at low temperature to form a heat-expandable layer having a thickness of 25 μm. The heat-expandable microspheres were microcapsules obtained by encapsulating isobutane with a vinylideneacrylonitrile copolymer (hereinafter the same). The mixed liquid used above was a liquid prepared by compounding 100 parts of a mixture of 100 parts of a natural rubber and 100 parts of a denatured natural rubber grafted with 20% of methyl methacrylate with 30 parts of an alkylphenol resin having a glass transition temperature of 140° C. and 35 parts of the heat-expandable microspheres having a mean particle size of 15 μm and a specific gravity of 1.01.

A rubber pressure-sensitive adhesive prepared by compounding 100 parts of the denatured natural rubber described above with 60 parts of an alkylphenol resin having a glass transition temperature of 100° C. was coated on the above heat-expandable layer and dried at low temperature (60°–70° C.) to form a pressure-sensitive adhesive layer, whereby the adhesive sheet of the present invention was obtained.

EXAMPLE 2

A compounded mixture obtained by adding 2 parts of a polyisocyanate crosslinking agent to a copolymer comprising 50 parts of butyl acrylate, 50 parts of ethyl acrylate, and 5 parts of acrylic acid was coated on one surface of a polyester film having a thickness of 25 μm and dried to form a rubber-like elastic layer having a thickness of 15 μm. A mixed liquid containing heat-expandable microspheres was coated on the layer and dried at low temperature (60°–70° C.) to form a heat-expandable layer having a thickness of 40 μm. The mixed liquid used above was prepared by compounding a copolymer having a weight average molecular weight of 250,000 comprising 80 parts of butyl acrylate, 15 parts of ethyl acrylate, and 5 parts of acrylic acid with 60 parts of the heat-expandable microspheres as used in Example 1 and 2 parts of a polyisocyanate crosslinking agent.

An acrylic pressure-sensitive adhesive prepared by compounding a copolymer comprising 95 parts of butyl acrylate and 5 parts of acrylic acid with 1 part of a polyisocyanate crosslinking agent was coated on the heat-expandable layer formed above and dried at low temperature to form a pressure-sensitive adhesive layer having a thickness of 0.5 μm, whereby the adhesive sheet of the present invention was obtained.

EXAMPLE 3

A compounded mixture obtained by adding 2 parts of a polyisocyanate crosslinking agent to a copolymer comprising 94 parts of butyl acrylate, 3 parts of vinyl acetate, and 3 parts of acrylic acid was coated on one surface of a rayon-made nonwoven fabric having a thickness of 50 μm and dried to form a rubber-like elastic layer having a thickness of 30 μm. A mixed liquid containing heat-expandable microspheres was coated on the layer obtained above and dried at low temperature to form a heat-expandable layer having a thickness of 40 μm. The mixed liquid used above was prepared by compounding a copolymer comprising 94 parts of butyl acrylate, 3 parts of vinyl acetate, and 3 parts of acrylic acid with 150 parts of the heat-expandable microsphere as used in Example 1 and 3 parts of a polyisocyanate crosslinking agent.

The acrylic pressure-sensitive adhesive as used in Example 2 was coated on the above heat-expandable layer and dried at low temperature to form a pressure-sensitive adhesive layer having a thickness of 5 μm, whereby the adhesive sheet of the present invention was obtained.

COMPARATIVE EXAMPLE

By following the same procedure as in Example 1 except that the heat-expandable layer having a thickness of 50 μm was directly formed on the substrate without forming the rubber-like elastic layer, an adhesive sheet was obtained.

EVALUATION TEST

Each of the adhesive sheets having a width of 20 mm obtained in the Examples and the Comparative Example described above was adhered to a polyester film having a thickness of 150 μm, and the adhesive force before heating (the initial adhesive force) and the adhesive force after heating at 170° C. for 45 seconds were determined by the system of measuring the 180° peeling adhesive force (peeling speed: 300 mm/minute, 23° C.).

The results obtained are shown in the Table below.

TABLE

| | Example | | | Comparative |
|---|---|---|---|---|
| | 1 | 2 | 3 | Example |
| Adhesive Force (g/20 mm) | | | | |
| Before heating: | 1,250 | 1,030 | 1,350 | 1,230 |
| After heating: | 170 | 80 | 5 | 350 |

In addition, from the magnified photographs obtained by photographing the states of the partial cross sections of the adhesive sheet obtained in Example 1 and the adhesive sheet obtained in the Comparative Example after the heat treatment, it could be confirmed that in the adhesive sheet of the present invention obtained in Example 1, the composite layer of the rubber-like elastic layer, the heat-expandable layer in a foamed and/or expanded state, and the adhesive layer was three-dimensionally deformed in a body to form a waved structure. Further, the waved structure was such that crest portions of the wave form were randomly formed, and in the cross section thereof, the rubber-like elastic layer formed the inside portion of the waved structure and a layer having substantially uniform thickness comprising the heat-expandable layer in the foamed and/or expanded state and the adhesive layer was formed thereon.

On the other hand, in the case of the adhesive sheet obtained in the Comparative Example, a layer having substantially uniform thickness comprising the heat-expandable layer in the foamed and/or expanded state and the adhesive layer was formed and small unevennesses caused by the foamed and/or expanded state were formed as in the adhesive sheet of Example 1, but a waved structure was not observed in the layer comprising the heat-expandable layer in the foamed and/or expanded state and the adhesive layer.

Figure 3:
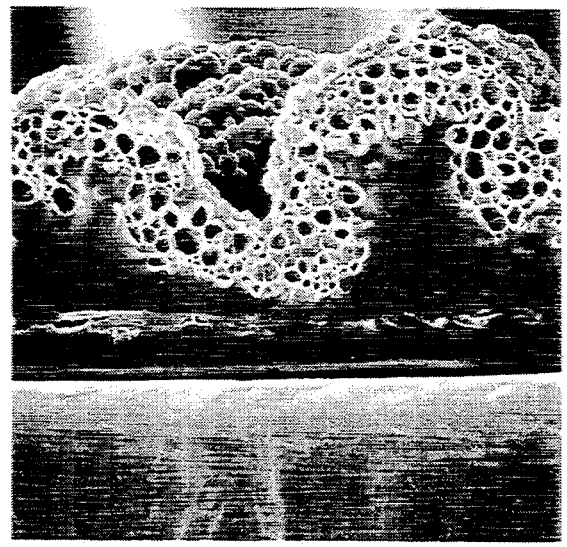
FIG. 3 is a photograph showing a partial cross section of the adhesive sheet of the present invention in Example 1 after heating.
Figure 4:
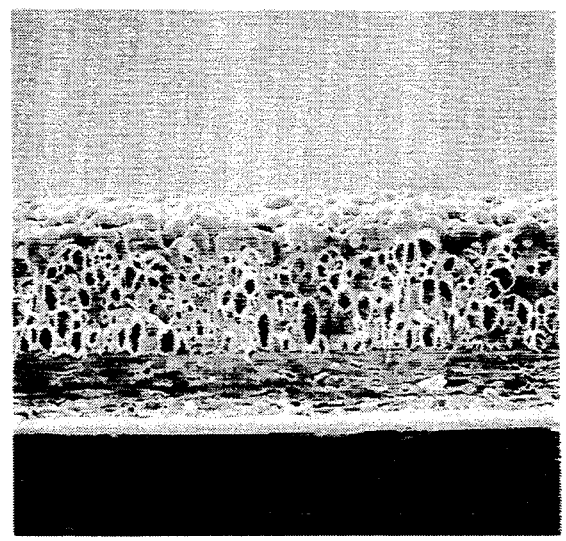
FIG. 4 is a photograph showing a partial cross section of an adhesive sheet in the comparative example after heating.

In addition, the photograph of the cross section of the adhesive sheet obtained in Example 1 is shown in FIG. 3 and that of the Comparative Example is shown in FIG. 4. The magnification of those photographs is 120 magnifications.

While the invention has been described in detail and with reference to specific embodiments thereof, it will be apparent to one skilled in the art that various changes and modifications can be made therein without departing from the spirits and scope thereof.

What is claimed is:

1. An adhesive sheet comprising a substrate having formed on one surface or both surfaces thereof an elastic layer, a heat-expandable layer, and an adhesive layer in the. order from the substrate side.

2. An adhesive sheet of claim 1, wherein the heat-expandable layer forms a three-dimensional structure by a foaming and/or expanding treatment caused by heating the adhesive sheet.

3. An adhesive sheet of claim 2, wherein the three-dimensional structure is a waved structure.

4. An adhesive sheet of claim 1, wherein the substrate is peelable from the elastic layer.

5. An adhesive sheet of claim 1, wherein the substrate and the elastic layer are strongly adhered to each other.

6. An adhesive sheet of claim 1, wherein the rubber-like elastic layer comprises a pressure-sensitive adhesive.

7. An adhesive sheet of claim 1, wherein the heat-expandable layer is formed from heat-expandable microspheres and a binder.

8. An adhesive sheet of claim 7, wherein the distance between the heat-expandable microspheres particles in the heat-expandable layer is 7 times or less the diameter of the microsphere having the largest diameter.

9. The adhesive sheet of claim 1, wherein the adhesive layer has a thickness of from 0.5 μm to 30 μm.

10. The adhesive sheet of claim 9, wherein the adhesive layer comprises a pressure-sensitive adhesive.

* * * * *